(12) United States Patent
Müller et al.

(10) Patent No.: US 11,987,116 B2
(45) Date of Patent: May 21, 2024

(54) SEQUENTIAL SWITCHING OF VENETIAN BLINDS

(71) Applicant: Montaplast GmbH, Morsbach (DE)

(72) Inventors: Johannes Müller, Waldbröl (DE); Andreas Thanheiser, Bonn (DE); Frank Mika, Nürmbrecht (DE)

(73) Assignee: MONTAPLAST GMBH, Morsbach (DE)

( * ) Notice: Subject to any disclaimer, the term of this patent is extended or adjusted under 35 U.S.C. 154(b) by 337 days.

(21) Appl. No.: 17/601,293

(22) PCT Filed: Apr. 2, 2020

(86) PCT No.: PCT/EP2020/059354
§ 371 (c)(1),
(2) Date: Oct. 4, 2021

(87) PCT Pub. No.: WO2020/201401
PCT Pub. Date: Oct. 8, 2020

(65) Prior Publication Data
US 2022/0176810 A1 Jun. 9, 2022

(30) Foreign Application Priority Data
Apr. 5, 2019 (DE) .................... 10 2019 108 990.5

(51) Int. Cl.
*B60K 11/00* (2006.01)
*B60K 11/08* (2006.01)
*B60R 19/52* (2006.01)

(52) U.S. Cl.
CPC ............ *B60K 11/085* (2013.01); *B60R 19/52* (2013.01)

(58) Field of Classification Search
CPC .............................. B60K 11/085; B60R 19/52
(Continued)

(56) References Cited

U.S. PATENT DOCUMENTS 9,233,605 B2 * 1/2016 Hijikata ............... B60K 11/085
9,399,888 B2 * 7/2016 Colson ...................... E06B 9/68
(Continued)

FOREIGN PATENT DOCUMENTS

DE   102008061054 A1   6/2010
DE   202011050523 U1   10/2011
(Continued)

OTHER PUBLICATIONS

Notice of Intention to Grant dated Nov. 17, 2022 in DE Application No. 20717813.8 (English translated claims).
(Continued)

*Primary Examiner* — Hau V Phan
(74) *Attorney, Agent, or Firm* — Panitch Schwarze Belisario & Nadel LLP (57) ABSTRACT

A device for sequentially switching at least one first and at least one second Venetian blind, the slats of which can each be synchronously rotationally moved by means of at least one coupling rod in order to open and close the blinds. The device includes an actuator for generating a rotational movement of the slats through 80° to 90°, a coupling for rotatably coupling the actuator to a slat of the first blind, a link rod which has a partially-circular link, and a transmission rod. The actuator has an eccentric pin parallel to its axis of rotation which engages in the partially-circular link of the link rod, and the linear movement of the link rod is transmitted to the coupling rod of the at least second blind.

10 Claims, 6 Drawing Sheets

(58) Field of Classification Search
USPC .......................................................... 180/68.1
See application file for complete search history.

(56) References Cited

U.S. PATENT DOCUMENTS

| | | | | |
|---|---|---|---|---|
| 9,988,837 | B2* | 6/2018 | Defenbaugh | E06B 9/322 |
| 10,100,707 | B2* | 10/2018 | Wolf | B60K 11/085 |
| 10,166,858 | B2* | 1/2019 | Ibañez | B60K 11/085 |
| 2012/0110909 | A1* | 5/2012 | Crane | B29C 48/151 |
| | | | | 49/70 |
| 2013/0012115 | A1* | 1/2013 | Schwarz | B60K 11/085 |
| | | | | 454/155 |
| 2014/0174220 | A1* | 6/2014 | Jeong | F16H 19/08 |
| | | | | 74/89.14 |
| 2014/0216834 | A1* | 8/2014 | Elliott | B60K 11/085 |
| | | | | 180/68.1 |
| 2015/0197148 | A1* | 7/2015 | Kobayashi | B60K 11/085 |
| | | | | 701/49 |
| 2016/0236563 | A1* | 8/2016 | Ruppert | B60R 19/52 |
| 2018/0086199 | A1* | 3/2018 | Solazzo | G01R 33/07 |
| 2018/0134146 | A1* | 5/2018 | Vacca | B60R 19/52 |
| 2019/0001810 | A1* | 1/2019 | Fujitani | B60K 11/085 |

FOREIGN PATENT DOCUMENTS

| | | |
|---|---|---|
| DE | 102011055394 A1 | 5/2013 |
| DE | 202017106531 U1 | 1/2019 |
| EP | 2233343 A2 | 9/2010 |
| WO | 2020201401 A1 | 10/2020 |

OTHER PUBLICATIONS

Office Action dated May 4, 2019 in DE Application No. 102019108990.5.
Int'l Search Report dated Jul. 23, 2020 in Int'l Application No. PCT/EP2020/059354.
Int'l Preliminary Report on Patentability dated Jan. 14, 2021 in Int'l Application No. PCT/EP2020/059354.
Int'l Preliminary Report on Patentability dated Jan. 14, 2021 in Int'l Application No. PCT/EP2020/059354 (Translation).

* cited by examiner

SEQUENTIAL SWITCHING OF VENETIAN BLINDS

CROSS-REFERENCE TO RELATED APPLICATIONS

This application is a Section 371 of International Application No. PCT/EP2020/059354, filed Apr. 2, 2020, which was published in the German language on Oct. 8, 2020, under International Publication No. WO 2020/201401 A1, which claims priority under 35 U.S.C. § 119(b) to German Application No. 10 2019 108 990.5, filed Apr. 5, 2019, the disclosures of each of which are incorporated herein by reference.

BACKGROUND OF THE INVENTION

The present invention concerns sequential switching of a louvre blind, in particular for controlling the airflow flowing into the engine compartment. The louvre blinds generally comprise a multiplicity of slats which are arranged one above the other and which are mounted rotatably by pins in a forwardly and rearwardly open housing in the lateral housing wall. When the louvre blind is closed the slats overlap in the vertical direction and prevent the airflow from penetrating into the engine compartment. When the louvre blind is open the slats assume a horizontal position so that the airflow can pass into the engine compartment between the slats for engine cooling. The position of the slats can be varied by an actuator arranged laterally with respect to the louvre blind. In that case the actuator generally acts on one of the slats and the rotary movement of the driven slat is transmitted by means of a coupling rod, in which eccentric pins provided parallel to the axes of rotation of the slats are guided.

In modern motor vehicles different assemblies are covered by separately switchable louvre blinds. For example a main louvre blind is provided for covering the engine radiator and at least one secondary louvre blind is provided for further units disposed in the engine compartment like an oil radiator, brakes and so forth. In that respect in accordance with the state of the art a specific dedicated actuator is generally used for each louvre blind.

DE 10 2011 055 394 A1 discloses an air flap assembly, wherein various air flap elements can be asynchronously actuated with only one drive device in a highly complicated system.

BRIEF SUMMARY OF THE INVENTION

The object of the present invention is to provide a simple solution in regard to sequential/asynchronous switching of a main and secondary louvre blind with only one actuator.

That object is attained by the independent claims.

The subject-matter of the invention is accordingly a first apparatus for sequentially switching at least one first and at least one second louvre blind, the slats of which are synchronously rotatably moveable for opening and closing the louvre blinds by means of at least one respective coupling rod, including an actuator for producing a rotary movement of the slats through 80° to 90°, a coupling for coupling the actuator to a slat of the first louvre blind in non-rotatable relationship, a link rod having a part-circular sliding guide, the actuator has an eccentric pin which is parallel to its axis of rotation and which engages into the part-circular sliding guide of the link rod so that upon rotation of the axis of the actuator the link rod is displaced in a linear movement which is converted into a rotary movement of the slats of the second louvre blind. The eccentric pin can be arranged on a crank disk non-rotatably connected to the actuator.

In the case of main and secondary louvre blinds which are arranged in mutually superposed relationship the link rod by virtue of its vertical movement can simultaneously take over the function of the coupling rod for converting the vertical movement into the rotary movement of the slats of the secondary louvre blind.

In the case of main and secondary louvre blinds which are arranged in mutually juxtaposed relationship or in the case of main and secondary louvre blinds of differing widths there can be provided a transmission rod which is rotatably fixed stationarily to the louvre blind housing, wherein the other end of the link rod engages the transmission rod at a pivotal lever and the transmission rod is coupled to the link rod of the at least second louvre blind by way of an articulated lever.

The radius of the part-circle of the part-circular sliding guide preferably corresponds to the spacing of the eccentric pin from the axis of rotation of the actuator and the part-circle can extend over an angular range of 80° to 350°, preferably over an angular range of 80° to 110°, in particular preferably about 90°.

In particular an electrically driven stepping motor is suitable as the actuator, which actuated by the engine management system in dependence on the temperature measurement data occurring in the engine management system like external temperature, coolant temperature, oil temperature, and so forth, and possibly the speed of travel.

If a first louvre blind is to be closed the actuator is firstly connected by way of the coupling which can be in the form of a magnetic coupling to the driven slat of that first louvre blind. The rotary movement of the motor closes the louvre blind, in which case at the same time the eccentric pin of the actuator moves through the sliding guide. When the pin has arrived at the end of the sliding guide the actuator is uncoupled. To close a second louvre blind the rotary movement of the actuator is continued, whereby the link rod is displaced in a linear movement which by way of the transmission rod acts on the second louvre blind and the coupling rod associated therewith or directly causes subsequent closure of the second louvre blind. Opening of the louvre blinds is effected by reversing the direction of rotation of the actuator.

If only the second louvre blind is to be closed the actuator is uncoupled from the beginning.

The subject-matter of the invention is further a second apparatus for sequential switching of at least a first and a second louvre blind, the slats of which are synchronously rotatably moveable for opening and closing the louvre blinds by means of at least one respective coupling rod, including an actuator for producing a rotary movement of the slats through 80° to 90°, a link rod having a part-circular sliding guide, wherein the actuator has two eccentric pins which are parallel to its axis of rotation and which are peripherally displaced through 70° to 110°, wherein one of the pins engages into the part-circular sliding guide of the link rod, wherein the other end of the link rod is either in one piece with the coupling rod or acts on a pivotal lever of a transmission rod which is coupled to the coupling rod of the at least second louvre blind and wherein the coupling rod of the first louvre blind has a sliding guide which is complementary to that of the link rod and into which the second pin of the actuator engages. The second pin can also be arranged on a crank disk non-rotatably connected to the actuator.

In this second embodiment of the invention the sliding guide of the coupling rod with the second eccentric pin takes over the function of the coupling of the first embodiment of the invention.

The radii of the two sliding guides corresponds to the spacing of the eccentric pins associated therewith from the axis of rotation of the actuator. Preferably the two part-circular sliding guides extend over an angular range of 80° to 350°, particularly preferably over an angular range of 80° to 100°. It is however not necessary for the angular range of both sliding guides to be the same. By way of example the part-circular opening of one sliding guide can extend over 180° and that of the other over 90°.

The rotary angle range of the actuator preferably extends over an angle of 160° to 180°. The angular spacing between the two eccentric pins of the actuator can be 70° to 110°, preferably 80° to 100°, particularly preferably about 90°.

BRIEF DESCRIPTION OF THE SEVERAL VIEWS OF THE DRAWINGS

Further details of the invention are described more fully in the accompanying Figures. Identical references in the different Figures denote the same functional elements of the invention.

DETAILED DESCRIPTION OF THE INVENTION

Figure 1:
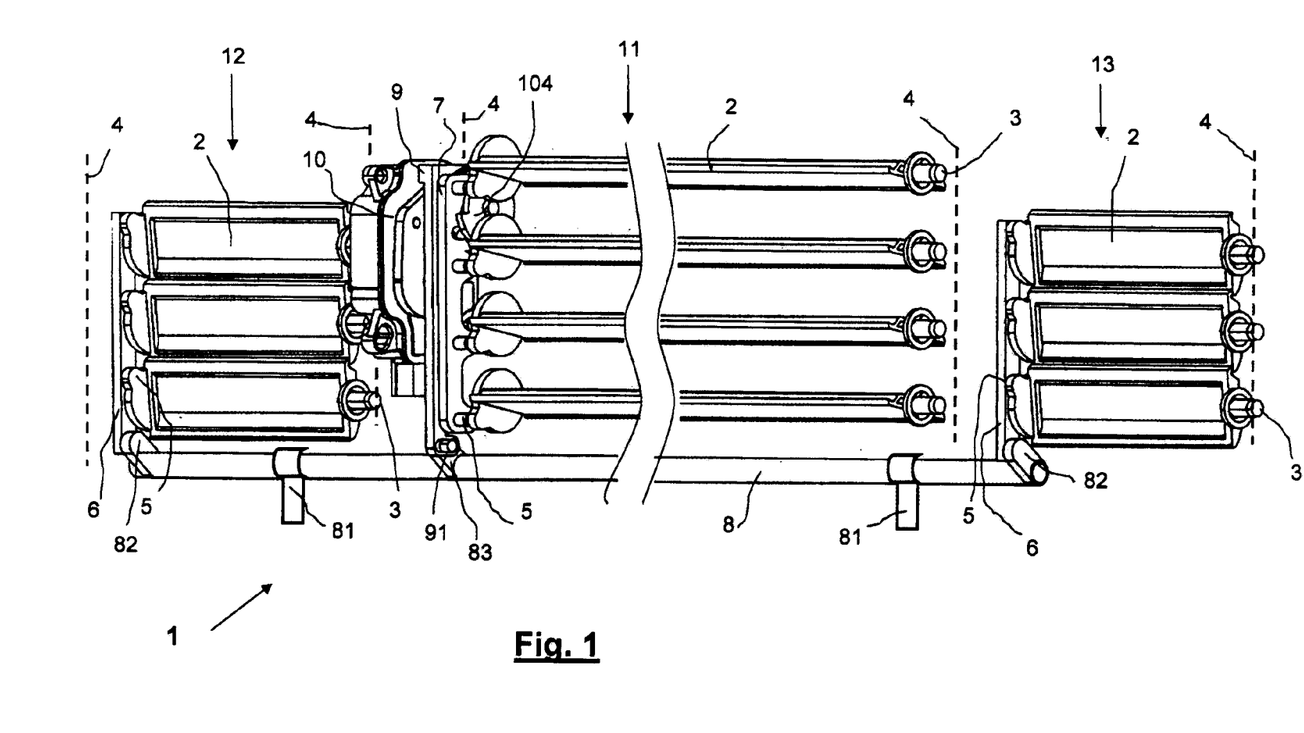
FIG. 1 shows an overall perspective view of the louvre blind arrangement according to the invention with main and secondary louvre blinds arranged in mutually juxtaposed relationship.

Referring to FIG. 1 the illustrated louvre blind arrangement 1 has by way of example a main louvre blind 11 and two secondary louvre blinds 12 and 13, with the secondary louvre blinds being arranged laterally beside the main louvre blind. The main louvre blind 11 is open with its slats 2 being horizontal and the secondary louvre blinds are illustrated closed with their slats 2 set vertically. The slats 2 have lateral pins 3 which are mounted rotatably in the side walls of the forwardly and rearwardly open louvre blind housing which is not shown. The side walls of the louvre blind housing are indicated by the broken lines 4. Each of the slats has arranged laterally with respect to the axis of rotation of the respective slat an eccentric pin 5. The pins 5 engage into vertically linearly moveable coupling rods 6 and 7 respectively and synchronize the rotary movement of the slats of a louvre blind. The arrangement further has a transmission rod 8 with an axis of rotation that is parallel to the axes of rotation of the slats 2. The transmission rod is stationarily rotatably mounted at 81 to the housing of the louvre blind arrangement. The transmission rod 8 is connected to the coupling rods 6 and the link rod 9 by way of pivotal levers 82 and 83 respectively which are non-rotatably connected to the transmission rod. The length of the pivotal levers can correspond to the eccentricity of the slat rotary pins 5 respectively associated therewith. The Figure further shows the link rod 2 and the actuator 10 which is preferably an electrically driven stepping motor.

Figure 2:
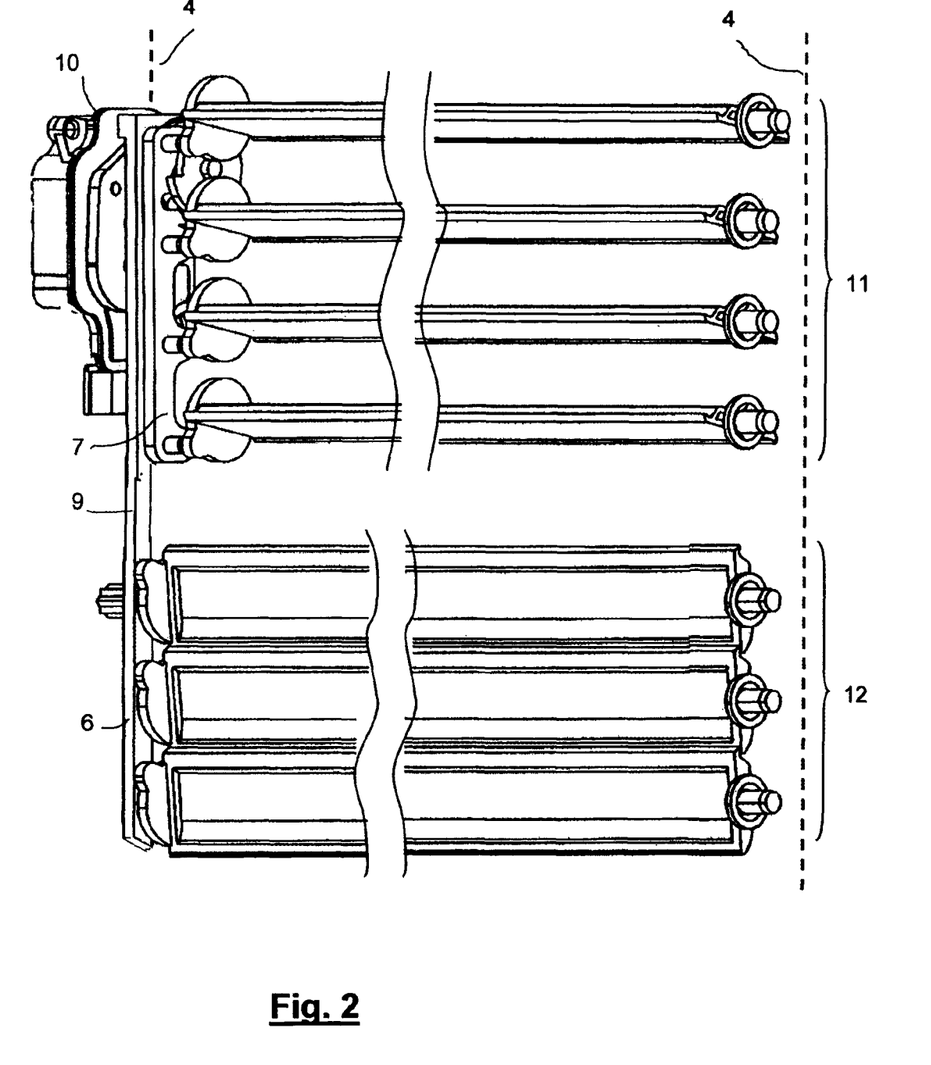
FIG. 2 shows a corresponding view for main and secondary louvre blinds arranged in mutually superposed relationship.

FIG. 2 shows an embodiment of the invention in which the main and the secondary louvre blind are disposed in mutually superposed relationship. The (upper) main louvre blind is open while the (lower) secondary louvre blind is closed. A transmission rod is not required in the case of a substantially aligned arrangement of the pins 3 of the slats of both louvre blinds. The link rod 9 can be formed in one piece with the coupling rod 6 for the secondary louvre blind. If the louvre blinds are of differing extents in respect of width the transmission rod with pivotal levers is required.

Figure 3:
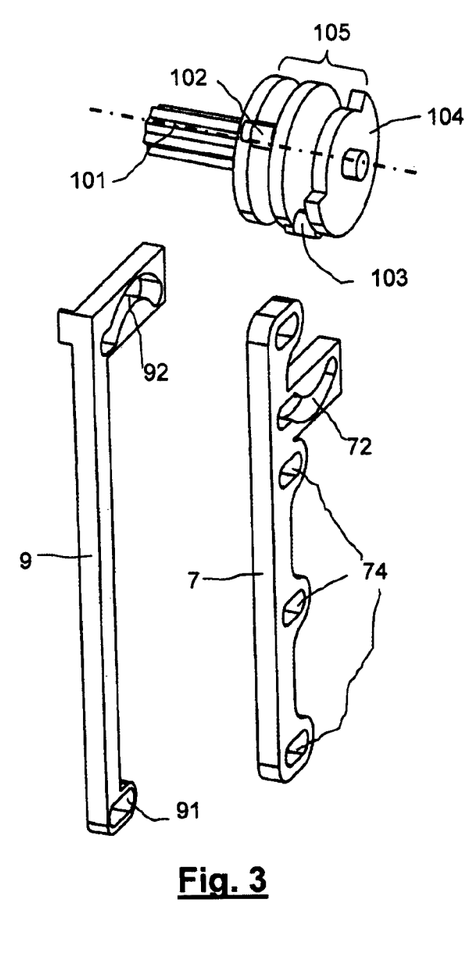
FIG. 3 shows perspective individual views on an enlarged scale of crank disk, link rod and coupling rod.

FIG. 3 shows in detail the link rod 9, the coupling rod 7 and the rotary spindle 101 drivable by the actuator 10. The spindle of the actuator has a crank disk 105 which is connected non-rotatably to the spindle 101, with two eccentric pins 102 and 103 disposed thereon. The pins are peripherally displaced through 80° to 110° with respect to the rotation of the spindle 101. The link rod 9 has a part-circular opening 92 ("sliding guide"), into which the pin 102 engages after assembly.

The radius of the sliding guide 92 corresponds to the spacing of the pin 102 from the axis 101 of the crank disk. The link rod is preferably guided at a housing wall so that its mobility is restricted to a linear movement. The coupling rod 7 has an opening 72 which is opposite to the part-circular opening 92 and which is curved in complementary relationship with the sliding guide 92 and into which the pin 103 of the crank disk 105 engages after assembly. The eccentric pins 5 of the slats of the louvre blind 11 engage into the openings 74. The part-circular openings 72 and 92 preferably extend over a peripheral angle range of 80° to 90°. In addition a rotary angle limiting disk 104 can be non-rotatably arranged on the spindle 101 of the actuator, to limit the angle of rotation of the spindle to 160° to 180°.

Figure 4:
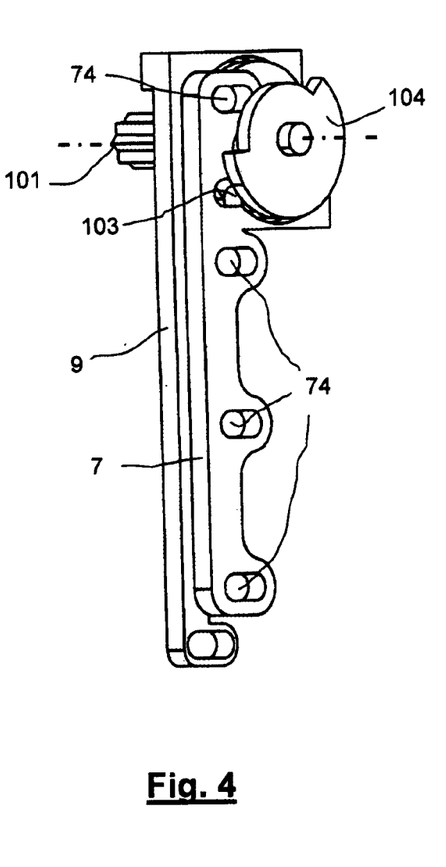
FIG. 4 shows the elements illustrated in FIG. 2 in the assembled state.

FIG. 4 shows the elements illustrated in FIG. 2 after assembly.

Figure 5:
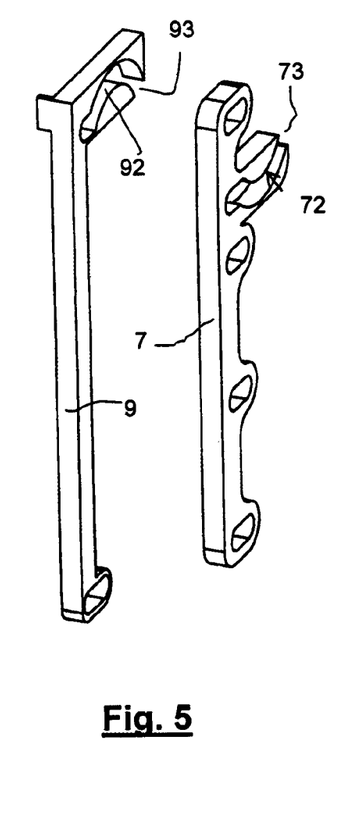
FIG. 5 shows an alternative embodiment of the link rod and the coupling rod.

FIG. 5 shows an alternative configuration of the coupling rod 7 and the link rod 9, with the sliding guides 72 and 92 being open at their ends at 73 and 93. That has assembly advantages insofar as the sliding guides of the link rod 9 and the coupling rod 7 can be hung into the pins 102 and 103 of the crank disk 105. In addition in the case of load-dependent control of the actuator, on-board detection (OBD) is possible if one of the elements for switching of the louvre blinds is defective, for example the pins 3 and 5 no longer engage. The actuator would then further rotate beyond the sliding guide, which the engine management system detects and provides a corresponding warning message for the driver. The abutments for the rotary movement of the slats are disposed on the housing 4.

Figure 6:
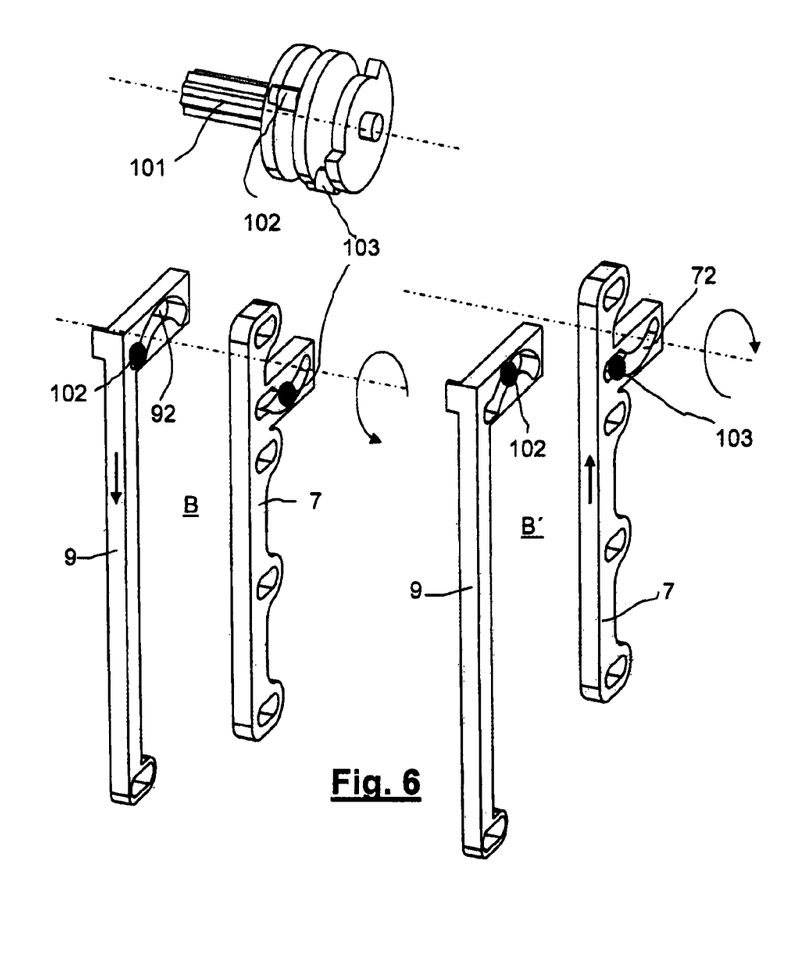
FIG. 6 shows two different states of the cooperation of crank disks, link rod and coupling rod as a perspective view.

FIG. 6 shows the positions of the pins 102 and 103 in two operating states B and B' within the sliding guides 72 and 92 in the form of black points, together with the direction of rotation of the spindle 101. In the operating state B (corresponding to the operating state D in FIG. 7) the pin 102 presses the link rod 9 downwardly. By way of the pivotal lever 83 the linear movement of the link rod 9 causes a rotational movement of the transmission rod 8, that is received by the coupling rods 6 of the secondary louvre blinds 12 and 13 by way of the pivotal levers 82, and is converted into a rotary movement of the slats by way of the eccentric pins 5 of the slats of the secondary louvre blinds 12 and 13. The pin 103 moves in the sliding guide 72 of the coupling rod 7 without moving same. In the operating state B' corresponding to the operating state B in FIG. 7 with the reverse direction of rotation the pin 103 presses the coupling rod 7 upwardly, converted with the openings 74 in the coupling rods 7 into which the eccentric pins 5 of the slats of the main louvre blind 11 engage, into a rotational movement of the slats of the main louvre blind 11. At the same time the pin 102 moves through the sliding guide 92 without moving the link rod 9 so that the secondary louvre blinds remain in their position.

Figure 7:
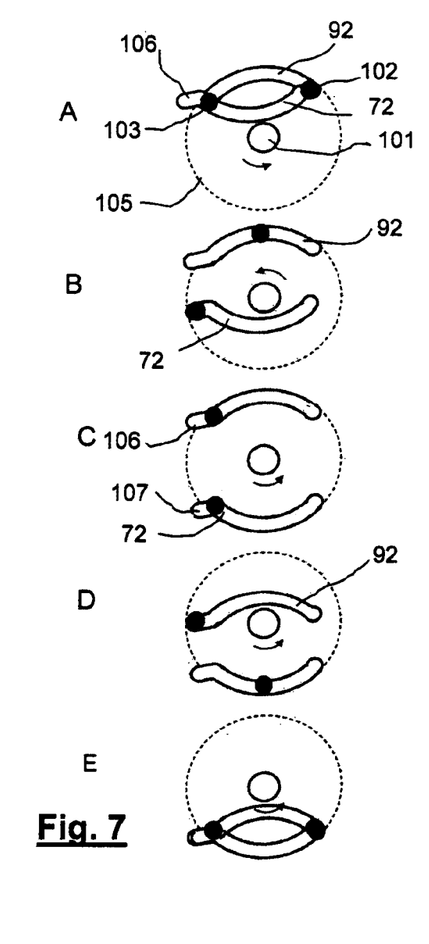
FIG. 7 shows five operating states of the sequential louvre blind switching.

FIG. 7 shows the relative position of the sliding guide 92 of the link rod 9 and the sliding guide 72 of the coupling rod 7 viewed in the direction of the axis of rotation of the actuator in five operating states A, B, C, D and E. The dotted-line circle 105 indicates the path of the pins 102 and 103. In the operating state A the main and secondary louvre blinds are for example closed (crank disk position 0°). When now the actuator causes the crank disk to rotate the sliding guide 72 and therewith the coupling rod 7 are moved downwardly while the pin 102 moves through the sliding guide 92 without causing a movement of the link rod 9.

In the operating state B an intermediate state (crankshaft position) 45° is reached, in which the secondary louvre blind 11 is half opened. In the operating state C (crankshaft position 90°) the pin 102 has reached the end of the part-circular sliding guide 92 and the secondary louvre blind is opened. Upon further rotation of the crank disk the sliding guide 92 is moved downwardly whereby the secondary louvre blinds are closed. In the operating state D (crankshaft position 135°) an intermediate state is reached, in which the secondary louvre blinds are open and the main louvre blind is half opened. In the operating state E (crankshaft position 180°) finally the main and secondary louvre blinds are opened. Closing of the louvre blinds is effected by reversing the direction of rotation of the crankshaft 105. References 106, 107 denote a horizontal region of the sliding guides which is preferably linear and at a right angle to the linear mobility of the link rod and the coupling rod to compensate for the deviation in the circular movement of the pins 102 and 103 from the linear movement of the coupling rod 7 and the link rod 9.

Figure 8:
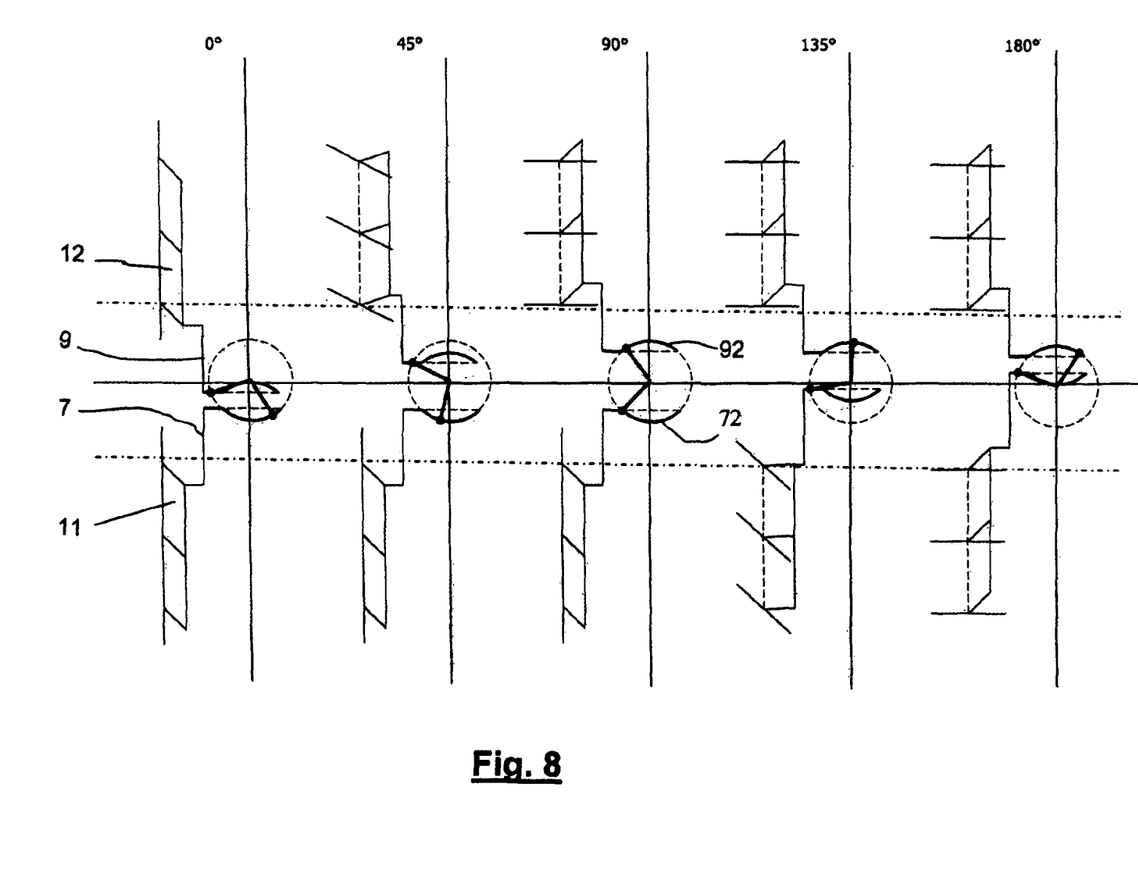
FIG. 8 shows a greatly abstracted view illustrating five operating states of the louvre blinds.

FIG. 8 shows a greatly abstracted view of main and secondary louvre blinds 11 and 12 and the open and closed positions thereof respectively in dependence on the rotary angle position (0°, 45°, 90°, 135° and 180°) of the crankshaft 105 and the eccentric pins 102 and 103 which are arranged thereon at a fixed angle (here about 100°) and which engage into the sliding guides 92 and 72 respectively of the link rod 9 and the coupling rod 7.

Figure 9:
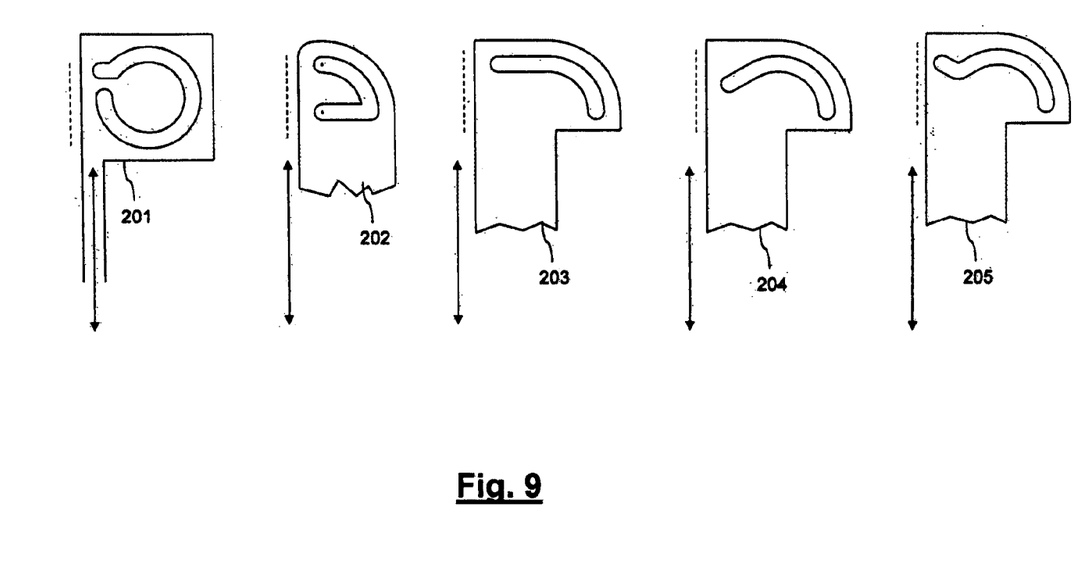
FIG. 9 shows possible forms of part-circular sliding guides.

FIG. 9 shows various possible options in regard to the configuration of the sliding guides 92 and 72 respectively. In this respect the sliding guides 92 and 72 can definitely be of differing configurations. For example the sliding guide 201 makes it possible to increase the rotary angle region about the axis 101 in such a way that the one louvre blind or the other can be selectively opened or closed first.

As in most travel situations of a motor vehicle the main louvre blind covering the vehicle radiator is open sequential switching of the louvre blinds is generally sufficient. However by allowing the reversal in the direction of rotation of the actuator in the operating situation A as shown in FIG. 7 it is possible to implement a reversal in the sequential switching. It is then only necessary to suitably adapt the permissible rotary angle of the rotary angle limiting disk 104. In addition only the one louvre blind or the other can be selectively closed in that way. Preferably then both ends of the sliding guides are provided with a compensating region 106.

It is not necessary for the radii of the part-circular configurations of the sliding guides 72 and 92 to be the same. If different radii are adopted it is only necessary to suitably select the spacing of the eccentric pins 102 and 103 associated with a sliding guide from the axis of rotation 101. Thus it is possible for example to increase the length of the linear movement of the link rod 9 by selecting a larger radius for the sliding guide 92.

Equally it is not necessary for the pivotal levers 82 and 83 (FIG. 1) of the transmission rod 8 to be of the same length. If for example the pivotal lever 83 is selected to be shorter than the pivotal lever 82 then a shorter linear movement of the link rod 9 can be implemented by way of the transmission rod 8 as a rotation of the slats of the secondary louvre blind over a larger angular range.

According to a further embodiment of the invention the eccentric pin 103 (FIG. 2) can be replaced by a coupling and the spindle 101 in the coupled condition of the coupling can act directly on the pivot axis 3 of one of the slats of the main louvre blind 11.

After the main louvre blind is closed the coupling can be uncoupled and the pin 102 has arrived at the other end of the sliding guide 92 of the link rod 9 then the secondary louvre blinds 12 and 13 can be closed as described after uncoupling by further rotation of the actuator by means of a linear movement of the link rod 9.

The invention claimed is:

1. An apparatus for the sequential switching of at least one first venetian blind and at least one second venetian blind each comprising slats which are synchronously rotationally moveable by at least one respective coupling rod to open and close the venetian blinds, the apparatus comprising:
    an actuator for generating a rotary movement of the slats through 80° to 90°,
    a coupling for rotatably coupling the actuator to the slat of the first venetian blind,
    a link rod having a part-circular guide, and
    a transmission rod,
    wherein the actuator has an eccentric pin parallel to an axis of rotation of the actuator, which engages into the part-circular guide of the link rod,
    wherein a fixed, rotatably mounted transmission rod is provided which has pivot levers attached thereto, wherein the link rod acts on the pivot lever to rotate the transmission rod and the pivot lever acts on the coupling rod of the at least second venetian blind, so that the linear movement of the link rod can be transmitted via the transmission rod to the coupling rod of the at least second venetian blind.

2. The apparatus as set forth in claim 1 wherein the transmission rod is fixedly and rotatably mounted on the housing of the venetian blind assembly.

3. The apparatus as set forth in claim 1 wherein the radius of the guide of the link rod corresponds to the spacing of the pin from the axis of rotation of the actuator.

4. The apparatus as set forth in claim 1 wherein the guides have, at least on one side, a compensating extension angled at 75° to 105° to the direction of movement of the respective link rod and/or coupling rod.

5. The apparatus as set forth in claim 1 wherein the guide of the link rod and/or the guide of the coupling rod are open on one side.

6. The apparatus as set forth in claim 1 wherein a angle limiting disk is non-rotatably arranged on the axis of rotation of the actuator.

7. The apparatus as set forth in claim 1 wherein the guide with the eccentric pin associated therewith and the guide with the eccentric pin associated therewith are connected such that the respective linear movements of the link rod and the coupling rod occur sequentially.

8. An apparatus for the sequential switching of at least one first venetian blind and at least one second venetian blind each comprising slats, wherein the slats are synchronously rotationally moveable by at least one respective coupling rod associated therewith to open and close the venetian blinds, the apparatus comprising:

an actuator for generating a rotary movement of the slats through 80° to 90°, wherein the actuator has two eccentric pins parallel to an axis of rotation of the actuator and connected thereto in a rotationally fixed manner, a link rod having a part-circular guide, wherein one of the pins engages in the part-circular guide of the link rod, wherein the coupling rod of the first venetian blind has a part-circular guide which is complementary to the guide of the link rod and in which the other pin of the actuator engages, whereby the coupling rod can be set into a guided linear motion, and linear movement of the link rod can be transmitted to the coupling rod of the second venetian blind, wherein the pins and are circumferentially offset to the axis of rotation by 70° to 110°.

9. The apparatus as set forth in claim 8 wherein the movement of the link rod is transmitted to the coupling rod by the link rod and the coupling rod being integrally formed.

10. The apparatus as set forth in claim 8 wherein the radius of the guide of the coupling rod of the first venetian blind corresponds to the spacing of the pin from the axis of rotation of the actuator.

\* \* \* \* \*